United States Patent

Cuppers et al.

(10) Patent No.: US 8,460,156 B2
(45) Date of Patent: Jun. 11, 2013

(54) METHOD FOR OPERATING A VEHICLE DRIVE TRAIN

(75) Inventors: Ruben Cuppers, Wangen (DE); Valentine Herbeth, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 88 days.

(21) Appl. No.: 13/140,035

(22) PCT Filed: Jan. 13, 2010

(86) PCT No.: PCT/EP2010/050340
§ 371 (c)(1),
(2), (4) Date: Jun. 16, 2011

(87) PCT Pub. No.: WO2010/081818
PCT Pub. Date: Jul. 22, 2010

(65) Prior Publication Data
US 2011/0263380 A1 Oct. 27, 2011

(30) Foreign Application Priority Data

Jan. 15, 2009 (DE) .......................... 10 2009 000 252

(51) Int. Cl.
*B60W 10/02* (2006.01)
*B60W 10/10* (2012.01)
(52) U.S. Cl.
USPC .......................................... 477/107; 477/180
(58) Field of Classification Search
None
See application file for complete search history.

(56) References Cited

U.S. PATENT DOCUMENTS

| | | | | |
|---|---|---|---|---|
| 5,556,349 A | * | 9/1996 | Ishii et al. | 477/76 |
| 5,890,994 A | * | 4/1999 | Sawamura et al. | 477/181 |
| 5,997,435 A | | 12/1999 | Back | |
| 6,128,565 A | * | 10/2000 | Tsutsui et al. | 701/51 |
| 6,520,889 B1 | | 2/2003 | Hughes et al. | |

(Continued)

FOREIGN PATENT DOCUMENTS

| | | |
|---|---|---|
| DE | 198 06 149 C1 | 6/1999 |
| DE | 198 44 783 C1 | 3/2000 |

(Continued)

OTHER PUBLICATIONS

Machine translation of DE 19844738, German reference originally supplied by applicant, ESPACENET.com Nov. 9, 2012.*

*Primary Examiner* — Justin Holmes
*Assistant Examiner* — Mark Manley
(74) *Attorney, Agent, or Firm* — Davis & Bujold, PLLC

(57) ABSTRACT

A method of operating a vehicle drive train with a drive machine and a transmission device during a coasting upshift, during which at least one interlocking shift element that is engaged in the force flow of the transmission device, to produce the gear ratio to be disengaged, is disengaged from the force flow, and a frictional shift element that has to be engaged, in the force flow of the transmission device to obtain the gear ratio to be engaged, is engaged in the force flow. When a shift command is given for a gear ratio change, torque applied at the interlocking shift element to be disengaged is reduced to at least approximately zero, by a defined engine intervention, and the interlocking shift element is then disengaged from the force flow of the transmission device.

5 Claims, 2 Drawing Sheets

U.S. PATENT DOCUMENTS

| | | |
|---|---|---|
| 7,115,060 B2 | 10/2006 | Gumpoltsberger |
| 7,611,438 B2 | 11/2009 | Diosi et al. |
| 2004/0116249 A1* | 6/2004 | Kayano et al. ................ 477/109 |
| 2004/0242372 A1 | 12/2004 | Lemon |
| 2004/0242373 A1 | 12/2004 | Wadas et al. |
| 2007/0167284 A1 | 7/2007 | Steinhauser et al. |
| 2007/0287587 A1* | 12/2007 | Steinhauser et al. .......... 477/107 |
| 2009/0280951 A1 | 11/2009 | Popp et al. |

FOREIGN PATENT DOCUMENTS

| | | |
|---|---|---|
| DE | 601 10 938 T2 | 1/2006 |
| DE | 10 2004 041 446 A1 | 3/2006 |
| DE | 10 2006 002 122 A1 | 7/2007 |
| DE | 10 2008 001 566 A1 | 11/2009 |
| EP | 0 873 902 A1 | 10/1998 |
| WO | 03/054420 A1 | 7/2003 |

\* cited by examiner

METHOD FOR OPERATING A VEHICLE DRIVE TRAIN

This application is a National Stage completion of PCT/EP2010/050340 filed Jan. 13, 2010, which claims priority from German patent application serial no. 10 2009 000 252.9 filed Jan. 15, 2009.

FIELD OF THE INVENTION

The invention concerns a method for operating a vehicle drive train.

BACKGROUND OF THE INVENTION

Vehicle drive trains known from practice are to an increasing extent constructed with automatic transmissions having frictional shift elements such as disk clutches or disk brakes. When a command is given for a gear ratio change in the automatic transmission, at least one frictional shift element engaged in the force flow of the automatic transmission in order to produce the gear ratio currently engaged in the automatic transmission has to be disengaged from the force flow of the automatic transmission, and at least one other frictional shift element, which is disengaged from the force flow of the automatic transmission while the current gear ratio is engaged, has to be engaged in the force flow of the automatic transmission in order to obtain the required gear ratio.

During this the torque transmitted by the frictional shift element engaged in the force flow in order to obtain the current gear ratio is taken up more and more as shifting time increases by the frictional shift element that has to be engaged in the force flow of the automatic transmission in order to produce the required gear ratio, while the torque that can be transmitted by the shift element to be disengaged decreases.

Disadvantageously, frictional shift elements in the disengaged operating condition give rise to drag torques which impair the overall efficiency of an automatic transmission to an undesired extent.

For this reason, besides frictional shift elements, automatic transmissions are also made with positively interlocking shift elements in the area of which no drag torques that affect the overall efficiency of an automatic transmission adversely occur.

However, only when they are close to their synchronous point can interlocking shift elements be shifted from a disengaged operating condition in which no torque can be transmitted by the interlocking shift element, to their engaged operating condition in which the whole of the torque applied can be transmitted by the interlocking shift element. Furthermore, interlocking shift elements engaged in the force flow of a transmission device can only be disengaged from the force flow with small shifting forces provided that they are close to their load-free operating condition. Both for the synchronization of interlocking shift elements and to bring them to their load-free condition, in contrast to frictional shift elements, additional structural devices are needed in order to be able to carry out shift operations that involve at least one interlocking shift element, within desirable shifting times.

Such additional structural devices, however, undesirably increase both the manufacturing costs of a transmission device and the structural space that it occupies.

SUMMARY OF THE INVENTION

Accordingly, the purpose of the present invention is to make available a method for operating vehicle drive trains, by means of which shift operations in the transmission devices, in particular automatic transmissions, which involve at least one interlocking shift element can be carried out within acceptable shifting times, inexpensively, and with little structural space occupation particularly in the area of the transmission device.

In the method according to the invention for operating a vehicle drive train with a drive machine and a transmission device, during a coasting upshift at least one interlocking shift element engaged in the force flow of the transmission device in order to produce the gear ratio to be disengaged is disengaged from the force flow and at least one frictional shift element to be engaged in the force flow of the transmission device in order to produce the gear ratio to be engaged, is engaged in the force flow, such that in the event of a shift command for a gear ratio change, a thrust torque applied on the interlocking shift element to be disengaged is reduced at least approximately to zero by a defined engine intervention in the area of the drive machine and the interlocking shift element is then disengaged from the force flow. In this case, before the point in time when the interlocking shift element is disengaged, the frictional shift element to be engaged is at least prepared for engagement in the force flow of the transmission device by applying a defined actuation force, so that coast upshifts called for can be carried out within short shifting times. If the frictional shift element to be engaged had a transmission capacity such that torque can be transmitted by it, the actuating force of the frictional shift element is adjusted to a value at which the transmission capacity of the frictional shift element to be engaged is at least approximately zero, so that the interlocking shift element can be changed safely in an at least approximately load-free condition by virtue of the engine intervention in the area of the drive machine.

By virtue of the method according to the invention when a coasting upshift is called for, in which the shift element to be disengaged from the force flow of the transmission device is an interlocking shift element and the shift element to be engaged is a frictional shift element, the thrust torque applied on the interlocking shift element to be disengaged is reduced without any need for additional structural devices since the interlocking shift element to be disengaged is brought to an essentially load-free condition by a defined engine intervention.

In this way gear ratio changes in the transmission devices, in particular automatic transmissions, in which a shift element to be disengaged from the force flow is an interlocking shift element, can be carried out to the desired extent within predefined or desired shifting times without additional structural devices that increase the manufacturing costs of the transmission device.

In an advantageous variant of the method according to the invention, the frictional shift element to be engaged is at least prepared for engagement in the force flow of the transmission device by the application of a defined actuating force before the point in time when the interlocking shift element is disengaged, which allows coasting upshifts called for to be carried out within shorter shifting times.

In a further advantageous variant of the method according to the invention, during the defined engine intervention a drive torque of the drive machine is changed by a torque value which corresponds at least approximately to the thrust torque to be applied by the drive machine at the drive output of the vehicle drive train. In this way the interlocking shift element to be disengaged is brought to an at least approximately load-free operating condition without any further measures.

In a variant of the method according to the invention, during the defined engine intervention the drive torque of the drive machine is changed by a torque value which corresponds at least approximately to the sum of the thrust torque applied by the drive machine at the output of the vehicle drive train and the torque that can be transmitted by the frictional shift element to be engaged, when the frictional shift element to be engaged has a transmission capacity such that a torque can be transmitted by the frictional shift element to be engaged.

In a further advantageous variant of the method according to the invention, the torque value of the drive machine is adapted as a function of the operating condition of the vehicle drive train in order to be able to carry out a shift operation that has been called for within a desired shifting time.

When a transmission capacity of the frictional shift element to be engaged is such that some torque can be transmitted by it, the defined actuating force of the frictional shift element to be engaged is adjusted to a value at which the transmission capacity of the frictional shift element to be engaged is at least approximately zero, so that the interlocking shift element to be disengaged can be reliably brought by the engine intervention in the area of the drive machine to an at least approximately load-free operating condition.

In a variant of the method according to the invention, the value of the actuating force of the frictional shift element to be engaged is adapted as a function of the operating condition of the vehicle drive train.

BRIEF DESCRIPTION OF THE DRAWINGS

Further advantages and advantageous further developments of the invention emerge from the claims and from the example embodiment whose principle is described with reference to the drawings, which show:

DETAILED DESCRIPTION OF THE PREFERRED EMBODIMENTS

Figure 1:
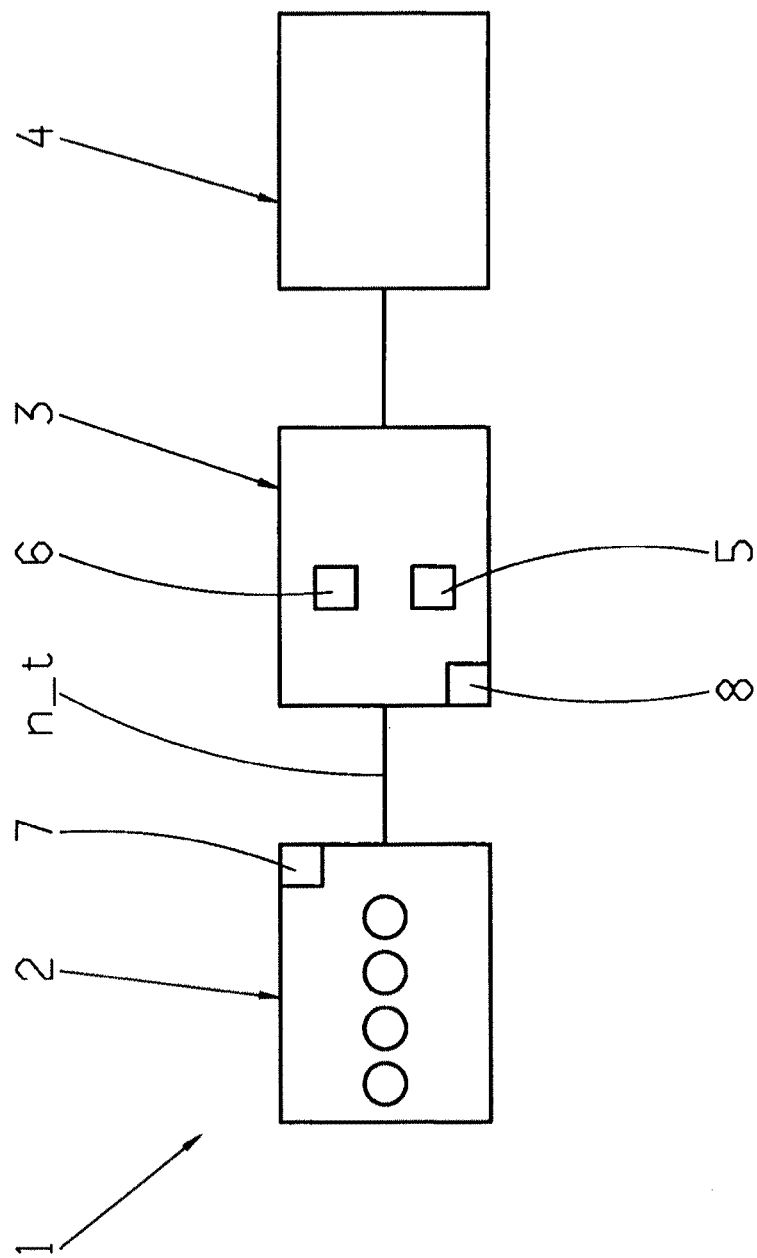
FIG. 1: A very schematic representation of a vehicle drive train.

FIG. 1 shows a vehicle drive train 1 with a drive machine 2 in this case in the form of an internal combustion engine, a transmission device 3 and a drive output 4, the transmission device being an automatic transmission. The transmission device 3 is constructed with a plurality of frictional shift elements 5 and at least one interlocking shift element 6, in order to be able to obtain various gear ratios for forward and reverse driving as a function of its operating condition and as a function of shift commands.

Figure 2:
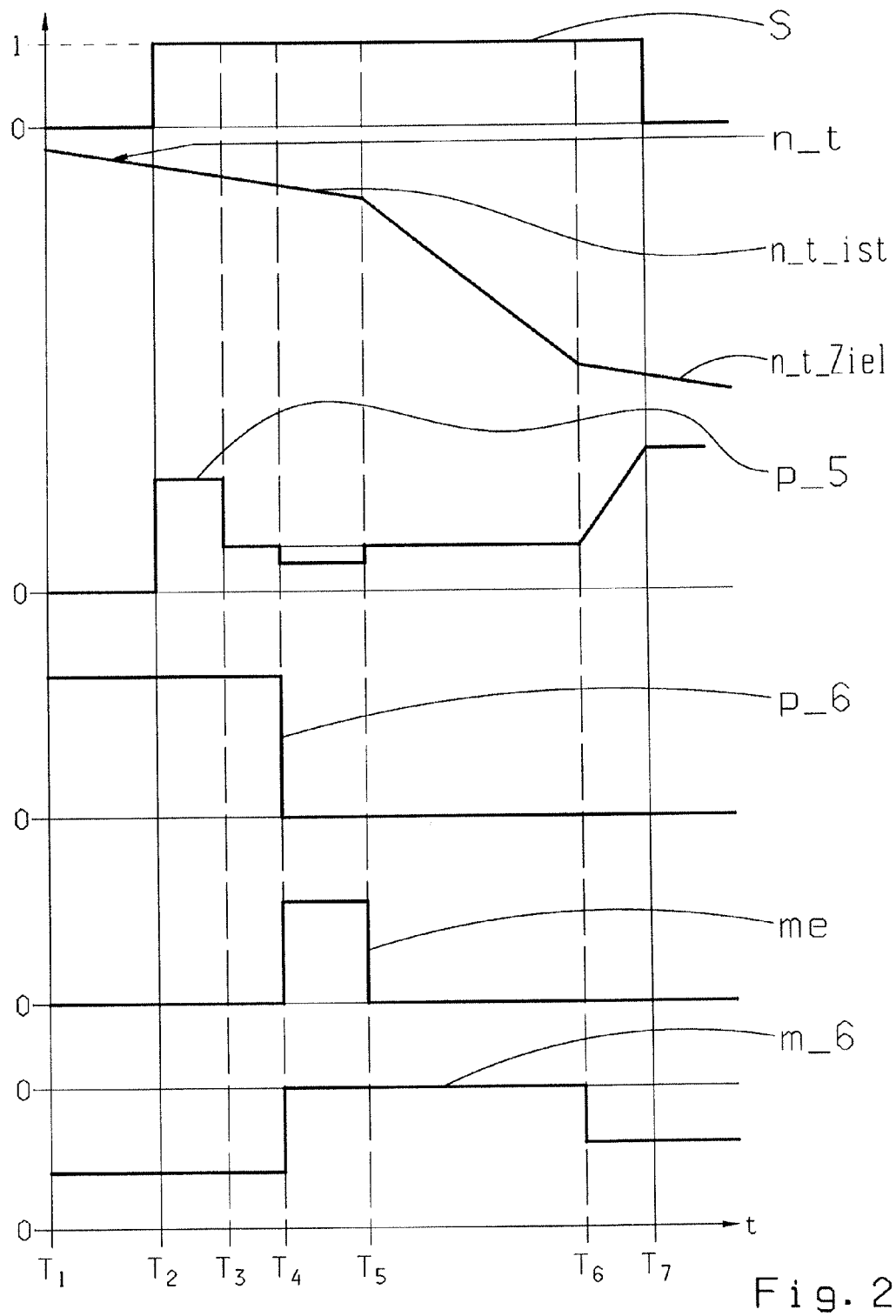
FIG. 2: A number of variations of various operating condition parameters of the vehicle drive train represented in FIG. 1, as functions of time t.

When a shift command is given for a gear ratio change in the transmission device 3 or to carry out a coasting upshift, during which an interlocking shift element 6 engaged in the force flow to produce the gear ratio currently engaged in the transmission device 3 has to be disengaged, whereas at least one of the frictional shift elements 5 has to be engaged in the force flow of the transmission device 3, the method described in more detail below with reference to the representation in FIG. 2 is implemented in order to be able to carry out the called for coasting upshift within a predefined shifting time without additional structural devices and with a high level of shifting comfort.

At a time T2 a shift command is given for a coasting upshift in the transmission device 3. The variation S, which reflects the status of the shift command, jumps at time T2 from the value zero to the value one. A variation of a turbine rotation speed n_t, which is equivalent to a transmission input speed of the transmission device 3, corresponds at time T1 to the synchronous speed n_t_ist of the gear ratio currently engaged in the transmission device 3.

In the manner shown in FIG. 2 and known per se, the frictional shift element 5 is prepared for engagement in the force flow of the automatic transmission 3 and the vehicle drive train by means of a varying actuating pressure p_5 during a rapid-filling phase that lasts until a time T3 and a subsequent filling adjustment phase that lasts until a time T4, before the moment T5 when the interlocking shift element 6 is disengaged.

At a time T4 a positive engine intervention is carried out in the area of the drive machine 2, during which a drive torque of the drive machine 2 is changed by a torque value that corresponds to the thrust torque applied at the drive output 4, whereby a torque m_6 applied at the interlocking shift element 6 to be disengaged falls essentially to zero. At the same time the actuating pressure p_6 of the interlocking shift element 6 to be disengaged is reduced essentially to zero, whereby the interlocking shift element 6, in this case designed as a claw clutch spring-loaded in the disengaging direction, changes to a disengaged operating condition because of the spring pre-loading and is then disengaged from the force flow of the transmission device 3.

At time T5 the engine intervention at the drive machine 2, whose status is graphically represented by the variation me in FIG. 2, is terminated again. As a result the turbine speed n_t changes as a function of the transmission capacity of the frictional shift element 5 to be engaged, from the synchronous speed n_t_ist of the gear ratio to be disengaged toward the synchronous speed n_t_ziel of the gear ratio to be engaged in the transmission device 3, and this is reached at time T6. Between times T6 and T7 the transmission capacity of the frictional shift element 5 to be engaged is increased to the full transmission capacity of the frictional shift element 5, so that at time T7 the shift command has been completed or carried out and the variation S jumps back again from the value one to the value zero.

By virtue of the method according to the invention the interlocking shift element 6 to be disengaged is bought to a load-free condition by the engine intervention and optionally by an additional pressure adaptation of the actuating pressure p_5 of the frictional shift element 5 to be engaged, and is then disengaged from the force flow of the transmission device 3.

For this, when the shift command is given at time T2 the frictional shift element 5 to be engaged is first pre-filled by means of a rapid-filling pulse. Then, between times T4 and T5 the engine intervention is carried out and the thrust torque applied at the interlocking shift element 6 is reduced so that load-free shifting takes place.

If the frictional shift element 5 prepared for engagement has a transmission capacity such that torque can be transmitted by the frictional shift element 5, the actuating pressure p_5 of the frictional shift element 5 is reduced between times T4 and T5 by a predefined pressure offset value and the transmission capacity of the frictional shift element 5 is reduced essentially to zero, so that the interlocking shift element 6 is in turn rendered completely free from load and can be disengaged. Thereafter, at time T5 the engine intervention is terminated and the actuating pressure p_5 of the frictional shift element to be engaged is increased by the pressure offset value. At the end of the predefined shifting time, after which the turbine speed n_t has reached the synchronous speed n_t_ziel of the new gear, the frictional shift element to be engaged is engaged completely between times T6 and T7.

The level of the engine intervention corresponds to the thrust torque produced by the drive machine 2, which is determined by an engine control unit 7 of the drive machine 2 and transmitted to a transmission control unit 8 of the transmission device 3. The pressure offset value of the actuating pressure p_5 of the frictional shift element 5 to be engaged is varied as a function of the operating condition of the vehicle drive train 1 existing at the time, although the pressure offset value can also be adapted as a function of various factors.

In this context, the pressure offset value of the actuating pressure p_5 of the frictional shift element 5 to be engaged is a function of the temperature of the transmission device 3 as well as other operating parameters of the vehicle drive train 1, and can also be varied as a function of the life of the transmission device 3.

| Indexes | |
|---|---|
| 1 | Vehicle drive train |
| 2 | Drive machine |
| 3 | Transmission device |
| 4 | Drive output |
| 5 | Frictional shift element |
| 6 | Interlocking shift element |
| 7 | Engine control unit |
| 8 | Transmission control unit |
| me | Variation |
| m_6 | Torque |
| n_t | Turbine rotation speed |
| n_t_ist | Synchronous speed |
| n_t_ziel | Synchronous speed |
| p_5 | Actuating pressure |
| p_6 | Actuating pressure |
| S | Variation |
| T1 to T6 | Points in time |
| t | Time |

The invention claimed is:

1. A method of operating a vehicle drive train (1) with a drive machine (2) and a transmission device (3) during a coasting upshift from a current gear ratio to a target gear ratio, during the coasting upshift at least one interlocking shift element (6) that is engaged in a force flow of the transmission device (3) to produce the current gear ratio is disengaged from the force flow and also a frictional shift element (5) that is engaged in the force flow of the transmission device (3) to produce the target gear ratio is engaged in the force flow, such that when a shift command is given for the coasting upshift, torque (m_6) applied at the interlocking shift element (6) is reduced at least approximately to zero, by a defined engine intervention, and the interlocking shift element (6) is disengaged from the force flow of the transmission device (3), the method comprising the steps of:

issuing a command for the coasting upshift with a control unit;

preparing the frictional shift element (5) by varying an actuating force of the frictional shift element before the interlocking shift element (6) is disengaged;

adjusting the defined actuating force of the frictional shift element (5) by a pressure offset value to a value such that a transmission capacity of the frictional shift element (5) becomes at least approximately zero reducing torque applied at the interlocking shift element to at least approximately to zero, by the defined engine intervention and disengaging the interlocking shifting element from the force flow of the transmission device;

increasing the actuating pressure of the frictional shift element by the pressure offset value; and fully engaging the frictional shifting element to produce the target gear ratio.

2. The method according to claim 1, further comprising the step of changing a drive torque of the drive machine (2), during the defined engine intervention, by a torque value which corresponds at least approximately to a thrust torque to be applied by the drive machine (2) at a drive output (4) of the vehicle drive train (1).

3. The method according to claim 1, further comprising the step of changing a drive torque of the drive machine (2), during the defined engine intervention, by a torque value which corresponds at least approximately to a sum of a thrust torque applied by the drive machine (2) at the drive output (4) of the vehicle drive train (1) and the torque that is transmittable by the frictional shift element (5) to be engaged.

4. The method according to claim 2, further comprising the step of adapting the torque of the drive machine (2) as a function of an operating condition of the vehicle drive train (1).

5. The method according to claim 1, further comprising the step of adapting the value of the actuating force of the frictional shift element (5) to be engaged as a function of an operating condition of the vehicle drive train (1).

* * * * *